United States Patent

Gor et al.

[15] 3,647,520
[45] Mar. 7, 1972

[54] ELECTRON BEAM CROSS-LINKING OF COATING COMPOSITIONS CONTAINING ETHYLENE UNSATURATED CARBOXYLIC ACID COPOLYMERS AND A MELAMINE COMPOSITION

[72] Inventors: Vishnu J. Gor, Blue Island; Ernesto H. Manuel, Park Forest, both of Ill.

[73] Assignee: Continental Can Company, Inc., New York, N.Y.

[22] Filed: July 6, 1970

[21] Appl. No.: 52,722

[52] U.S. Cl. ............117/93.31, 117/161 UN, 117/161 UT, 117/161 LN, 117/161 UC, 260/29.6 HN, 260/29.4 U, 260/856 X, 260/DIG. 31, 204/159.21
[51] Int. Cl. ...........................................................B44d 1/50
[58] Field of Search.................117/93.31, 161 UZ, 161 UN, 117/161 LN, 161 UT, 161 UC; 260/29.4 U, 29.6 HN, 850, 856, DIG. 31; 204/159.21

[56] References Cited

UNITED STATES PATENTS

| | | | |
|---|---|---|---|
| 3,214,488 | 10/1965 | O'Donnell et al. | 117/161 UC |
| 3,361,842 | 1/1968 | Applegath et al. | 204/159.22 |
| 3,450,660 | 6/1969 | Sekmakas | 117/161 LN |

FOREIGN PATENTS OR APPLICATIONS 1,026,066   4/1966   Great Britain.........................260/856

Primary Examiner—Alfred L. Leavitt
Assistant Examiner—J. H. Newsome
Attorney—Paul Shapiro, Joseph E. Kerwin and William A. Dittmann

[57] ABSTRACT

A process for coating articles wherein a thin film containing a mixture of a copolymer of ethylene and an ethylenically unsaturated carboxylic acid and a melamine composition is applied to the surface of the article and the film mixture cross-linked to form a hardened coating by irradiation with a beam of high-energy electrons.

8 Claims, No Drawings

ELECTRON BEAM CROSS-LINKING OF COATING COMPOSITIONS CONTAINING ETHYLENE UNSATURATED CARBOXYLIC ACID COPOLYMERS AND A MELAMINE COMPOSITION

BACKGROUND OF THE INVENTION

1. Field of the Invention

This invention is related to the coating of articles such as metals, plastics, paper, and the like, and more particularly to organic coatings obtained by cross-linking an ethylene copolymer on the article surface by irradiation with high energy electrons.

2. Description of the Prior Art

In the manufacture of containers from metal sheet, a protective organic coating is applied to the side of the metal sheet which is to form the interior of the container. The materials which are employed for coating the metal sheet are generally heat-curable, resinous materials which are applied in the form of a solution or dispersion in a volatile solvent. The wet-coated metal surface is passed through an oven in which hot air is circulated to evaporate the solvent and to cure the coating material to the required hardness. As this form of coating application is relatively slow, the art is continually seeking more rapid methods of increasing the speed of coating application.

Among the various methods which have been proposed to increase the speeds at which metal sheet can be coated is to apply a layer of suitable thickness of an ethylenically unsaturated monomer or mixture of monomers to the metal sheet surface whereupon the monomer layer is activated to interact and form a hard, infusible polymer coating by exposing the layer to a source of high-energy electrons. The activation action is carried out at ambient temperatures, and since the action of the high-energy electrons is extremely rapid, the monomer layer can be rapidly polymerized to a cured coating of the required hardness in a continuous flow movement across the source of irradiation.

Although a wide variety of ethylenically unsaturated monomeric compounds have been proposed for use in forming polymeric coatings using high-energy electron curing procedures, these compounds, when exposed to a source of high-energy electrons radiation do not always form hard, adherent solvent-resistant coatings of the type which are required for container coatings.

SUMMARY OF THE INVENTION

In accordance with the present invention, there is provided a rapid method of preparing hard, adherent, polymeric coatings on articles and particularly metal substrates wherein there is applied to the article substrate a thin film containing a mixture of a melamine composition and a copolymer of ethylene and an ethylenically unsaturated carboxylic acid and the coated side of the substrate is exposed to a source of high-energy electrons to effect cross-linking of the copolymer and to convert the mixture into a continuous, hard coating on the substrate.

As will hereinafter be illustrated, it is a critical and essential feature of the present invention that in order to effectively achieve cross-linking of ethylene-carboxylic acid copolymers into hard coating materials with high-energy electron radiation the material utilized in admixture with the copolymer be melamine or a composition having a melamine structure, as other compositions of the amine class related to melamine such as benzaguanamine are not effective in the cross-linking reaction.

The process of the present invention reduces the time of the oven baking cycle which is conventionally used for producing metal surface coatings. The process of the present invention also eliminates the air pollution problem encountered in the use of organic solvents as resin vehicle dispersants of the prior art as the components of the present coating materials are dispersed in aqueous media.

PREFERRED EMBODIMENTS

The ethylene-ethylenically unsaturated carboxylic acid copolymers employed in the practice of the present invention generally contain about 75 to about 90 weight percent ethylene and about 10 to about 25 weight percent of the ethylenically unsaturated carboxylic acid and preferably about 75 to about 85 weight percent ethylene and 15 to 25 weight of the carboxylic acid.

The molecular weight of the ethylene/carboxylic acid coplymers as defined in terms of melt index (ASTM–D1238–58T) is generally in the range of 100 to 500 g./10 min., and more particularly, in the range of 150 to 400 g./10 min.

The ethylenically unsaturated carboxylic acid component of the copolymer is an $\alpha, \beta$-ethylenically unsaturated carboxylic acid having from three to eight carbon atoms. Examples of such acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate, and maleic anhydride. Although maleic anhydride is not a carboxylic acid in that it has no hydrogen attached to the carboxyl groups, it can be considered as acid for the purposes of the present invention because of its chemical reactivity being that of an acid. Similarly other $\alpha, \beta$-monoethylenically unsaturated anhydrides of carboxylic acids can be employed.

Illustrative examples of melamine compounds which may be employed in the practice of the present invention include (1) melamine, (2) N-substituted melamine wherein from 1–3 of the amino hydrogen atoms are replaced with alkyl, cycloalkyl, aryl, or acyl groups containing one to six carbon atoms, such as 2,4-diamino-6-methylamino-s-triazine, 2,4-diamino-6-dimethylamino-s-triazine, 2,4-diamino-6phenylamino-s-triazine, 2,4-diamino-6-acetylamino-s-triazine, 2,4-diamino-6-butylamino-s-triazine, 2-amino-4,-6 di (cyclohexylamino)-s-triazine, 2-amino-4,6- di (methylamino)-s-triazine, 2-amino-4-methylamino-6-dimethylamino-s-triazine, 2,4,6-tri (methylamino)-s-triazine, 2,4, 6-tri (cyclo hexylamino)-s-triazine, 2-amino-4-butylamino -6-methylamino-triazine, (3) aldehyde condensates of such melamine compounds such as melamine/formaldehyde condensates and (4) alkylated melamine formaldehyde condensates. The alkylated melamine/formaldehyde condensates are the etherfied reaction products of at least 3 molar proportions of a monohydric alcohol containing one to six carbon atoms such as methanol, ethanol, propanol, butanol and a condensation product of from 3 to 6 molar proportions of formaldehyde and 1 molar proportion of melamine.

Among the specific alkylated melamine/formaldehyde condensates that may be employed in the practice of the present invention are the polymethyl ethers of polymethyol melamine such as the tetramethyl ether of tetramethyol melamine, the hexamethyol ether of hexamethyol melamine, for example, as is commercially available under the trade name CYMEL 301 being preferred.

The ethylene/carboxylic acid copolymer-melamine composition coating composition used in the practice of the present invention is conveniently applied to the substrate to be coated in the form of an aqueous colloidal dispersion. The aqueous dispersion is advantageously prepared by dispersing the ethylene/ethylenically unsaturated carboxylic acid copolymer in an aqueous liquid system containing the melamine composition and an amount of an alkaline compound sufficient to effect a dispersion. The alkaline compound is present in the aqueous system in an amount sufficient to neutralize a major amount of the carboxylic acid units present in the copolymer. Generally, the amount of alkaline material required to effect a stable dispersion is in the range of about 0.8 to about 2.0 stoichrometric equivalents per carboxyl group in the copolymer.

Amount the various alkaline compounds which may be employed as neutralizing reagents to prepare the colloidal dispersions of the present invention are the hydroxides of the alkali metals such as NaOH, LioH, and KOH, concentrated ammonia, ammonium hydroxide, tetramethyl-ammonium hydroxide, monoalkyl amines such as ethylamine and propylamine, secondary and tertiary amines, such as dimethylamine and trimethylamine, diethyl and triethyl amine and the like, monoalkanol amines, such as ethanolamine and propanolamine, and polyalkanolamines such as di- and triethanolamine, monocycloalkyl amines such as cyclohexylamine, and monocycloalkano amines such as cyclohexanol amine. In addition, certain strong heterocyclic monoamines are also suitable for employment as dispersing agents, such as morpholine, and pyridene. However, $NH_4OH$ usually gives the best results in the simplest way and is, accordingly, preferred.

As applied to 79 article substrate, the dispersions consist of about 60 to about 80 percent by weight water, about 5 to about 20 percent of a dispersing agent such as $NH_4OH$ and about 20 to about 40 percent by weight solids of which 80 to 95 percent by weight is the ethylene/ethylenically unsaturated carboxylic acid copolymer and 5 to 20 percent by weight of the melamine compound.

To effect the coating of an article substrate in accordance with the present invention, a thin film of the aqueous dispersion of the ethylene/carboxylic acid copolymer and melamine composition is applied to the substrate surface and is heated to about 110° to about 250° C. for about 10 to 30 seconds to effect removal of the aqueous dispersing medium and is irradiated with a beam of high-energy electrons to cure the mixture to a hard, infusible coating.

High-energy electrons used to effect cross-linking of the ethylene/carboxylic acid copolymer with the melamine compound in accordance with the present invention are obtainable from beams of high-energy electrons produced by high-voltage electron accelerators. There are several well-known types of electron accelerators available for this purpose. For example, the Van de Graaff electrostatic accelerator resonant transformers, transformer-rectifiers, impulse of capacitrons, microwave linear accelerators, betratrons and synchrotrons. The Van de Graaff type generator and the transformer-rectifiers produce electron beams in continuous streams, while the other generators mentioned produce the beams in pulses.

Generally, an electron beam having an average potential of below 500,000 volts is of sufficient potential to initiate cross-linking of the ethylene/carboxylic acid copolymer with the melamine composition. Ordinarily, the potential of the electron beam used to initiate cross-linking is maintained in the range of about 150,000 to 450,000 volts. Preferably, a potential in the range of about 200,000 to about 350,000 volts is employed. At these potential ranges the tube current is in the range of about 5 to 100 milliamperes, 10–50 milliampes being the preferred current.

The dosage of the irradiation produced by these electron beams is measured in terms of the quantity of energy absorbed by the material irradiated. The "rad" is the unit of absorbed dose. In radiation dosimetry, the megarad is defined as a dose of irradiation producing an energy absorption of 100 million ergs per gram of absorbent material irradiated.

In order to effect cross-linking of the ethylene/carboxylic acid copolymer with the melamine composition using high energy electron irradiation in accordance with the process of the present invention, a dosage level within the range of about 0.1 megarad to about 10.0 megarads has been found to be satisfactory.

In coating metal substrates in accordance with the process of the present invention, the film dispersion is applied to the substrate in any convenient manner as by spraying, dipping, roll coating and the like.

The dispersion formulation for use in this invention may also contain fillers, dyes, pigments, and the like, provided that these materials do not affect or prevent the cross-linking of the ethylene/carboxylic acid copolymer with the melamine composition contained in these mixtures.

In coating metal surface in accordance with the process of the present invention, a thin film of the aqueous dispersion is applied on the substrate to be coated, generally in the form of a sheet, which is positioned to travel on a conveyor and dried to remove the aqueous dispersant before it is passed under a source of the high-energy electron beam. In most instances, the high energy electron source is maintained at about 1 to 10 inches from the substrate undergoing irradiation.

The preferred coating weight for coating metal sheet substrates with an adequately protective organic coating suitable for use in container manufacture is in the range of 1.0 to 15.0 milligrams of cross-linked polymer coating per square inch of substrate surface. To obtain these coating weights, the aqueous dispersion is applied at a coating thickness of about 0.1 to 2.0 mils, which thickness is sufficient to permit adequate penetration by the electron beam radiation to effect the cross-linking of the mixture composition.

The present invention is illustrated, but not limited, by the following example:

EXAMPLE

Aqueous colladial dispersions were prepared having the following composition ranges:

| Component | Parts By Weight |
| --- | --- |
| Ethylene/acrylic acid copolymer (E/AA)* | 25 |
| Melamine | 5–15 |
| $NH_4OH$ (28% solution) | 5 |
| Water | 70 |

*Acrylic acid content, 20 weight percent, melt index 300 decigrams/min. (ASTM D-1238-8T).

The dispersion compositions were applied to 5×3 in cold-rolled chromium treated steel plates at a thickness of 0.1 mil. The coated plates were left at room temperature for 5 minutes to allow evaporation of the water dispersant. The dried plates were then passed under the window of an electron accelerator and the dried coating irradiated under the following conditions:

| | |
| --- | --- |
| Voltage | 300,000 volts |
| Current | 30 milliamperes |
| Conveyor Speed | 53 feet/minute |
| Atmosphere | Air |
| Dosage | 4.2 megarads |
| Distance of coating surface from window | 8 inches |

The irradiated films were found to be polymerized, hard, adherent coatings. The coated plates were then rubbed with a cloth saturated with methyl ethyl ketone (MEK) to determine whether the coating softens or can be removed by the rubbing. The number of rubs with MEK which are required to soften or remove the coating is a direct indication of the degree to which the coating material has been cured or cross-linked. The results of the MEK test are recorded in the table below.

The procedure of the example was repeated with the exception that Cymel 301, a commercially available hexamethylol ether of hexamethylol melamine was substituted for melamine in the dispersion coating. The results of the MEK rub test on dispersion coatings containing Cymel 301 are also recorded in the table below.

For purposes of comparison, the procedure of the example was repeated with the exception that amine compositions other than melamine containing materials were substituted for melamine in the dispersion coatings that were cross-linked using high-energy electrons. The results of the MEK test on these comparative coating materials are also recorded in the table below (designated by the symbol "C").

TABLE

| Test No. | Cross-linking Agent (CLA) | Concentration of CLA in coating formulation Parts | MEK* Rubs After Radiation |
|---|---|---|---|
| 1 | Melamine | 5 | 5 |
| 2 | Melamine | 10 | 10 |
| 3 | Melamine | 15 | 6 |
| 4 | Cymel 301 | 5 | 6 |
| 5 | Cymel 301 | 10 | 12 |
| 6 | Cymel 301 | 15 | 8 |
| C₁ | Benzoquanamine | 5 | 1 |
| C₂ | Benzoquanamine | 10 | 1 |
| C₃ | Benzoquanamine | 15 | 1 |
| C₄ | Butylated Urea/formaldehyde resin** | 5 | 1 |
| C₅ | Butylated Urea/formaldehyde resin** | 10 | 1 |
| C₆ | Butylated Urea/formaldehyde resin** | 15 | 1 |
| C₇ | None | — | 1 |
| C₈ | Cymel 301 *** | 98 | **** |

*All coatings could be removed with 1 MEK Rub before panel was irradiated.

**Uformite F-140 commercially available (Rohm & Haas Co.) butylated urea/formaldehyde resin.

***No ethylene/acrylic acid copolymer in coating formulation.

****Tacky, did not harden under electron beam radiation.

From the above table, it is readily apparent that the electron beam irradiation of coating compositions comprised of mixtures of ethylene/acrylic acid copolymers and melamine compounds such as melamine and alkylated melamine/formaldehyde condensates in accordance with the process of the present invention produces coatings which are cured to a more substantial degree than ethylene/acrylic acid copolymer containing coating compositions which contain amine compounds closely related to melamine but which are outside the scope of the present invention.

What is claimed is:

1. A process for coating an article comprising the steps of:
    applying to the surface of the article to be coated a thin film of an aqueous colloidal dispersion of a melamine composition and a copolymer of ethylene and an $\alpha, \beta$-ethylenically unsaturated carboxylic acid having three to eight carbon atoms,
    removing the aqueous dispersant from the film coated substrate; and then
    irradiating the film containing surface with a source of high-energy electrons to effect cross-linking of the ethylene copolymer to obtain the coated article.

2. The process of claim 1 wherein the copolymer is comprised of about 75 to about 90 weight percent of ethylene and about 10 to about 25 weight percent of the $\alpha, \beta$-ethylenically unsaturated carboxylic acid.

3. The process of claim 1 wherein the $\alpha, \beta$-ethylenically unsaturated carboxylic acid is acrylic acid.

4. The process of claim 1 wherein the melamine composition is melamine.

5. The process of claim 1 wherein the melamine composition is a melamine/formaldehyde condensate.

6. The process of claim 1 wherein the melamine composition is an alkylated melamine/formaldehyde condensate.

7. The process of claim 1 wherein the melamine composition is the hexamethyl ether of hexamethylol melamine 8. The process of claim 1 wherein the deposited film is irradiated with a dosage of 0.1 to 10 megarads.

* * * * *